April 5, 1960 R. M. BONIFACE 2,931,129
EDUCATIONAL CONSTRUCTION KIT
Filed Aug. 15, 1955 3 Sheets-Sheet 1
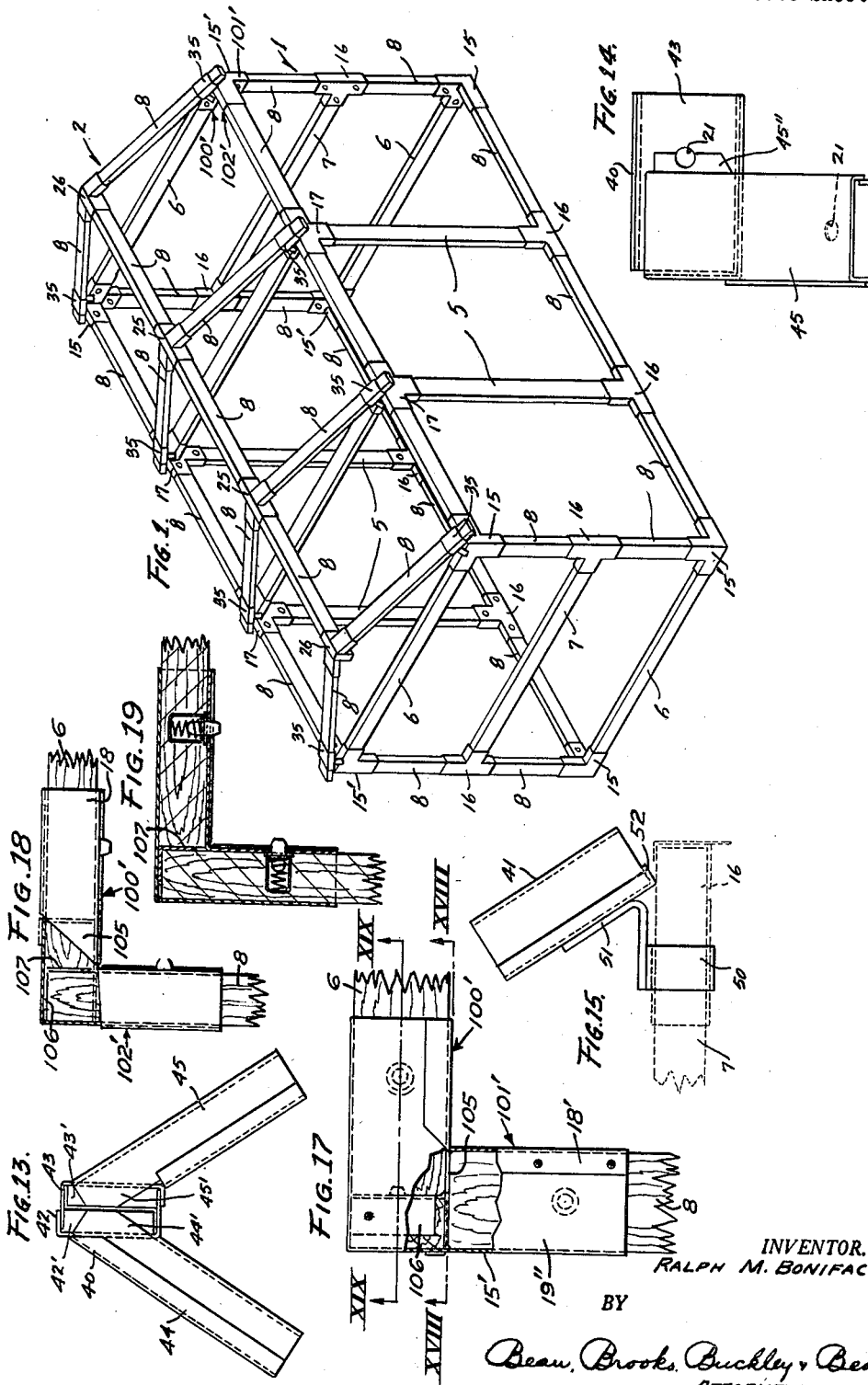
INVENTOR.
RALPH M. BONIFACE
BY
ATTORNEYS

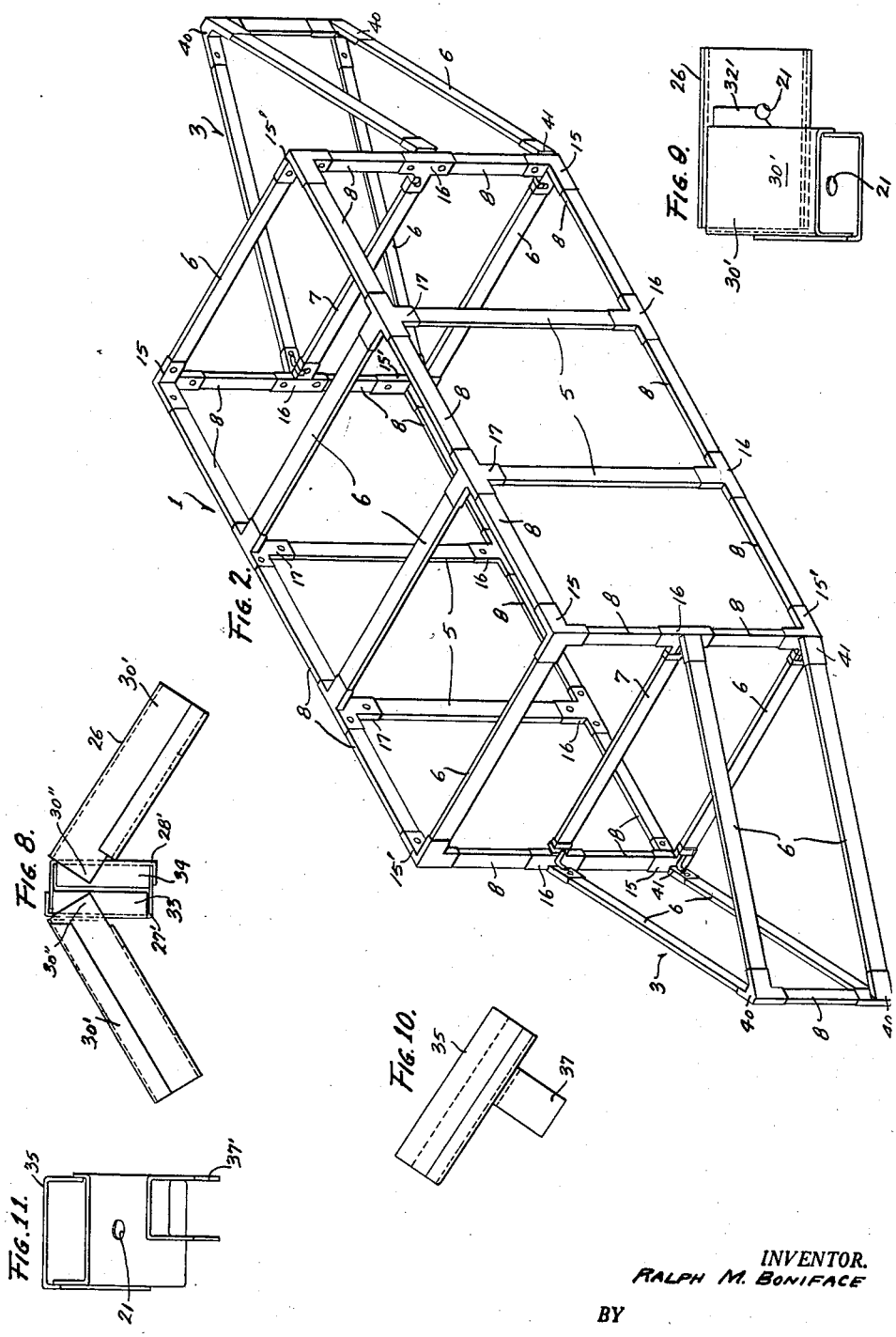

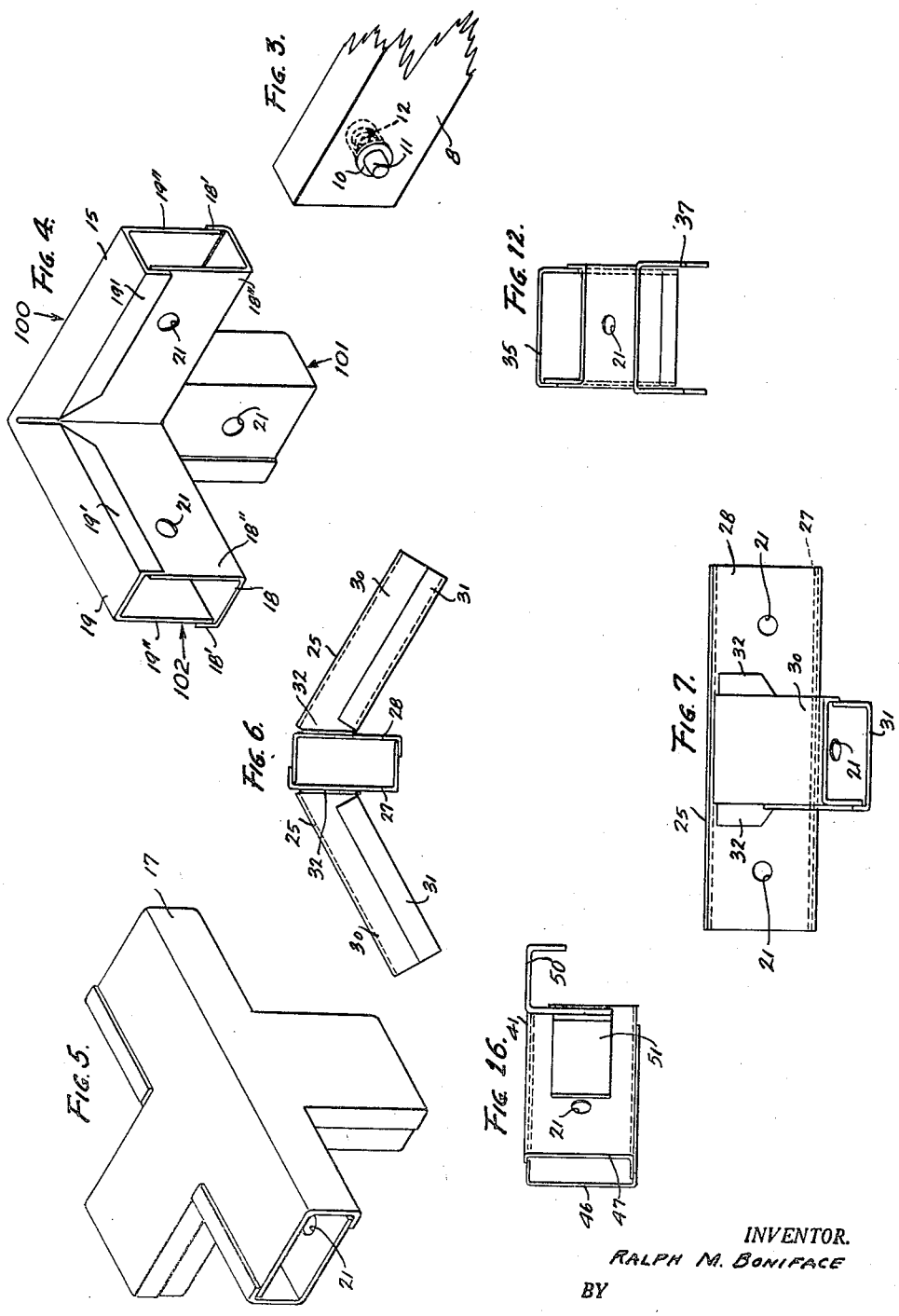

ated Apr. 5, 1960

United States Patent Office 2,931,129
Patented Apr. 5, 1960

2,931,129

EDUCATIONAL CONSTRUCTION KIT

Ralph M. Boniface, Hamburg, N.Y.

Application August 15, 1955, Serial No. 528,183

4 Claims. (Cl. 46—17)

This invention relates generally to the education field, and more specifically to a new and useful basic tool specifically designed for use in conjunction with the project method of instruction in the nursery, kindergarten and primary grades.

The project method of instruction, now widely used with children in these age groups, seeks to encourage their creative and investigative tendencies, to stimulate their imagination, to aid them in understanding visual impressions to which they have been deliberately exposed, and to teach them to work together as a group on their own initiative, and this is accomplished by means of projects suggested by the children themselves. This invention is concerned with those projects wherein the children construct various building and other structures.

Proper tools are necessary if the children are to receive the full benefit of this type of instruction, and it has been my experience during many years of close association with this particular field and type of instruction that tools meeting the basic requirements have not been available.

Toy construction kits are well known, but they are not suitable for this purpose because often they are too intricate for use by children in this age group, and in any event they are for the purpose of constructing miniature models whereas the project method of instruction requires a kit enabling the children to construct large structures simulating a house, a store, a boat and the like, and in and around which they can play and on which they can paint designs, such structures being nearly full size models to children of that age group.

The traditional media for this purpose have not been practical for most purposes. The proper type of lumber often is too expensive, and such media usually has required anchoring, as to the floor, which is most undesirable because of the resulting damage to the floor. Also, such prior art attempts have required entirely too much supervision by the teacher and have placed severe and undesired limitations on the degree of self-sufficiency provided the children with relation to the project. Large size blocks have been tried but they do not fulfill the need because they are relatively costly, require considerable storage space, and are bulky and indeed somewhat hazardous because of their size and weight. They are not sufficiently rigid and if means for making them more rigid are used the assembly becomes too intricate and requires too much teacher interruption. It must be appreciated that wherever too much supervision and assistance is required of the teacher the children become discouraged, and with children in this age group very little is required to discourage them completely from the project which they have originated.

Accordingly, it is a primary object of my invention to provide a basic tool for use with the project method of instruction, which tool comprises a construction kit composed of frame and bracket members which are readily used by children of this age group to construct large scale models of houses, boats and other structures.

Another object of my invention is to provide a construction kit which is readily assembled and disassembled by children of this age group with a very minimum amount of assistance from, and indeed often only limited guidance by the teacher.

Another object of my invention is to provide an educational construction kit which is readily assembled by young children to provide a rigid, interlocking frame structure requiring no external anchoring, and which when collapsed is very compact and requires a minimum of storage space.

An educational construction kit in accord with my invention is characterized in one aspect thereof by the provision of a plurality of elongated frame members, a plurality of connecting bracket members having socket portions receiving the frame members, and means for securely but releasably securing said frame members to said bracket members including spring-backed plungers carried by the frame members and engaging in apertures in a wall of the bracket member socket portions.

In another aspect thereof, an educational construction kit in accord with my invention is characterized by the use of colors to identify like parts and to distinguish between unlike parts.

In still another aspect thereof, an educational construction kit in accord with my invention is characterized by the provision of frame members of rectangular cross section, the bracket members being formed substantially of a pair of complementary parts having interfitting channel formations providing socket portions of rectangular cross section.

In still other aspects thereof, an educational construction kit in accord with my invention is characterized by the provision of frame and bracket member parts for making a rectangular basic frame structure, to which can be added parts for making a gable roof structure and/or one or more prow structures.

The foregoing and other objects and advantages of an educational construction kit of my invention will become clearly apparent from the ensuing detailed description of a presently preferred embodiment thereof, taken together with the accompanying drawings wherein like reference numerals denote like parts throughout the various views and wherein:

Fig. 1 is a generally perspective view of a building structure, including a basic framework and a gable roof therefor, constructed with the kit of my invention;

Fig. 2 is a generally perspective view of the basic framework of Fig. 1, with prow structures at opposite ends thereof constructed with the kit of my invention;

Fig. 3 is a generally perspective view, of a frame member, broken away for ease of illustration, showing the plunger type releasable catch used with a construction kit of my invention;

Fig. 4 is a generally perspective view of a corner bracket member;

Fig. 5 is a generally perspective view of another bracket member used in the basic framework;

Fig. 6 is an end elevational view of a center gable bracket member;

Fig. 7 is a side elevational view of the bracket member of Fig. 6;

Fig. 8 is an end elevational view of an end gable bracket member;

Fig. 9 is a side elevational view of the bracket member of Fig. 8;

Fig. 10 is a side elevational view of an eave bracket member;

Fig. 11 is a side elevational view taken at about a right angle to Fig. 10, showing an end eave bracket member;

Fig. 12 is a view corresponding to Fig. 11 but showing a center eave bracket member;

Fig. 13 is a top plan view of a front prow bracket member;

Fig. 14 is a side elevational view of the bracket member of Fig. 13;

Fig. 15 is a top plan view of a rear prow bracket member;

Fig. 16 is a side elevational view of the bracket member of Fig. 15;

Fig. 17 is an end elevational view of a corner bracket corresponding to that of Fig. 4 but of the opposite hand;

Fig. 18 is a sectional view taken about on line XVIII—XVIII of Fig. 17; and

Fig. 19 is a sectional view taken about on line XIX—XIX of Fig. 17.

The educational construction kit of my invention comprises the various parts required to construct a rectangular basic frame generally designated 1 (Figs. 1 and 2), together with the parts required to construct a gable roof generally designated 2 (Fig. 1) and the parts required to construct a pair of prow structures generally designated 3 (Fig. 2). Thus, with my kit, children can readily construct the basic frame 1 to which can be added the gable roof 2 to provide the building structure of Fig. 1, and to the opposite ends of which can be added the prows 3 to provide the boat structure of Fig. 2.

The various parts provided with my kit comprise a plurality of elongated frame members made of wood or other suitable light weight material which is of course smooth to avoid any possibilty of splinters and the like, together with appropriate connecting bracket members.

Thus, considering now the parts making up the basic frame structure 1, I provide for example four identical upright frame members 5, six identical cross frame members 6, two other identical cross frame members 7, and twenty identical frame members 8. Further by way of example, the members 5 can be four feet long, the members 6 can be three feet long, the members 7 can be thirty-four and one-half inches long, and the members 8 can be two feet long, the other dimensions of the frame members being identical throughout. Of course, it will be appreciated that the foregoing quantities and dimensions are given by way of example only, and that they can be varied as desired without departing from my invention.

Preferably, frame members 5 through 8 are made of polished wood of rectangular cross section, and with the foregoing arrangement it will be seen that my basic frame structure 1 is over four feet high, three feet wide, and six feet long. This provides a basic frame structure of a size readily handled by children in the age group under consideration, while being big enough for them to play in and around and treat as a playhouse, store, railroad station, and the like.

A primary advantage of my invention resides in the ease with which it can be assembled and disassembled by children in this age group, while at the same time providing a very sturdy and rigid structure requiring no anchoring to the floor or other structure. This is accomplished by using the socket type connecting bracket members hereinafter described having openings which are engaged by spring-loaded bullet type plungers carried by the frame members 5 through 8. Such a spring-loaded plunger is shown in Fig. 3 on a frame member 8, it being understood that corresponding plungers are used on all of the frame members 5 through 8.

In each instance, the plunger comprises a cup 10 set within a face of the frame member and carrying a projecting bullet type plunger part 11 held against separation therefrom and biased to its laterally projecting extended position by the spring 12. The projecting plunger part has a rounded front surface, whereby it is readily cammed to its retracted position to then automatically project into the opening provided for that purpose in the connecting brackets, as will more fully appear hereinafter. Such plunger type catches are known per se, but their use in a construction kit of this type is believed to be novel and offers many significant advantages.

The various connecting bracket members used in the basic frame structure 1 are each substantially of two piece construction comprising complementary metal stampings secured together preferably by spot welding, and for the basic frame structure illustrated I provide eight corner bracket members 15, 15' (four of one hand and four of the opposite hand) (Figs. 4, 17, 18 and 19), eight T bracket members 16 and four 4-way or double T bracket members 17 (Fig. 5).

In each instance, the connecting bracket members comprise complementary sheet metal stampings each having a plurality of channel formations extending at various angles, the channel formations of one part interfitting with the corresponding channel formations of the other part to provide a plurality of angularly projecting rectangular socket portions.

Thus, looking now at Fig. 4, the corner bracket 15 comprises substantially two complementary parts 18 and 19 formed to provide three right angularly related channel formations having the relatively short side walls 18' and 19', respectively, and the relatively long side walls 18'' and 19''. It is believed that the manner of forming each of the parts 18 and 19 to provide the shapes shown in the drawing is well known in the metal working art and needs no further description here, and it will be observed that the respective channel formations interfit with the short side walls 18' and 19' overlapping the long walls 19'' and 18'', respectively, to provide box-like sleeves or sockets 100, 101 and 102 of rectangular cross section, the overlapping side walls being secured together as by spot welding.

Each socket is adapted to receive any of the frame members 5 through 8 in slip-fitting relation therewith, and each socket is provided on its inner wall or face with an aperture in the form of an opening therethrough as shown at 21 into which the plunger 11 is adapted to project. Thus, the members 5 through 8 are slip-fitted into the bracket member sockets in the manner shown in Figs. 1 and 2 and the spring-backed plungers 11 will project into the openings 21 to releasably lock the frame and bracket members in assembled relation.

Also, stop means are provided for each socket, limiting the inward movement of the frame members to a point where the plungers 11 are aligned with the openings 21.

Thus, looking now at Figs. 17, 18 and 19 which show a corner bracket 15' corresponding to the bracket 15 of Fig. 4 but for a corner of the opposite hand, the web portion of part 18 in socket 100' is formed to provide a stop 105 defining the inner end of socket 101', and an angle member is provided having a flange 106 secured to side wall part 19'' and a depending flange 107 defining the inner end of socket 100'. The side wall part 19'', or to be exact the flange 106 secured thereto, defines the inner end of socket 102', flange 107 being positioned in line with side wall part 18'' in socket 102'.

Thus, these end stops prevent the children from inserting one frame member too far and thereby misaligning all of the frame members in a particular bracket member. The children simply slip the frame members into the socket portions until they abut the stops at the inner ends thereof, and the plungers are automatically aligned with the openings 21.

The bracket members 17 are formed of complementary interfitting channel formations in the same manner as bracket members 15, except that they are formed to provide a pair of opposed sockets and third and fourth sockets extending at substantially a right angle thereto and to each other. The opposed sockets are open at their inner ends, and the frame members therein abut each other, while the inner ends of the third and fourth sockets are defined by walls of the opposed sockets, acting as stops. The T bracket members 16, not shown in detail, generally correspond to bracket members 17 except that the inwardly projecting socket portion is dispensed with.

The basic frame structure 1 is readily assembled and disassembled by children in this age group because frame members 5 through 8 slip-fit easily into the socket portions of the bracket members 15, 16 and 17. The round nose plunger 11 is cammed to retracted position by the socket portion side wall automatically as the frame member is inserted therein, and projects into the opening 21 to lock the frame member to the bracket member. The rectangular cross section of the frame members and the bracket member socket portions, and the laterally projecting plunger type catch, provide an assembly sufficiently rigid and strong without further connections or anchoring, and yet the structure can be disassembled by young children. The connection between the frame members and the bracket members is very simply and quickly made or broken, but the members will not accidentally disconnect because a postive, deliberate action is required.

A highly flexible structure is provided, one which young children can handle and adapt to a wide variety of uses, and the resulting structure is nicely adapted to have kraft paper walls or the like secured thereto for decoration by the children.

I preferably provide the openings 21 on the inner side wall of the various socket portions, with the plungers projecting from the same side of each frame member adjacent the opposite ends thereof.

Also, to assist the children in identifying and selecting the various frame and bracket members, I paint all of the members so that identical members all are of the same color, while different members are of a different, contrasting color. This is a significant feature of my invention, because it enables the children to quickly associate the various members with respect to their position and function in the basic frame structure, and reduces the amount of supervision and assistance required of the teacher.

Thus, all of the frame members 5 will be of the same color, and the frame members 6, 7 and 8, will be of different colors, the same being true of the various bracket members, which color identification facilitates self-sufficiency on the part of the children.

The additional parts for making the gable roof structure 2 comprise rafter members, ridge pole members, gable bracket members and eave bracket members. In the structure illustrated, there are eight rafter members 8 so designated because they are identical with the basic frame members 8, three ridge pole members 8 also identical with the basic frame members 8, two center gable bracket members 25 (Figs. 6 and 7), two end gable bracket members 26 (Figs. 8 and 9), four center eave bracket members (Figs. 10 and 12) and four end eave bracket members (Figs. 10 and 11).

Looking now at Figs. 6 and 7, the center gable bracket members 25 each comprise a pair of opposed channel formations 27 and 28 having overlapping side portions of unequal length and interfitting to provide an openended socket having opposed socket portions receiving the ridge pole members 8. Openings 21 are formed in the web of the part 28 to receive the plungers 11 carried by the ridge pole members.

Third and fourth socket portions incline downwardly from opposite sides of the assembled parts 27 and 28 to receive the rafter members 8, and each comprise opposed channel formations 30 and 31 formed and interfitting in the manner previously described with the parts 30 having lateral flanges 32 secured to the web portions of parts 27 and 28 as by spot welding. The frame members in the opposed socket portions will abut, while the formations 27 and 28 act as stops at the inner ends of the third and fourth socket portions.

The end gable bracket members 26 are formed in a similar manner, excepting that the parts 27' and 28' form a socket open at only one end, the opposite end thereof being closed by inturned flanges 33 and 34 acting as stops as clearly shown in Fig. 8. Also, in place of the laterally extending flanges 32, the downwardly inclined parts 30' simply extend rearwardly on one side thereof, as at 30", where they are secured to the inturned flanges 33 and 34 as by spot welding, parts 30' having at the other side thereof laterally projecting flanges 32' secured to the webs of the parts 27' and 28'.

The center and end eave bracket members (Figs. 10, 11 and 12) each comprise opposed channel formations similar to those previously described and providing a socket portion 35 for receiving the rafter members in slip-fitting relation therewith. The center eave bracket members are secured to the basic frame structure by an inverted U-shaped connecting part 37 (Figs. 10 and 12) adapted to slip-fit over the inwardly projecting socket portions of the bracket members 17, the end eave bracket members having a narrower connecting part 37' (Fig. 11) adapted to slip over the inwardly projecting socket portions of the corner bracket members 15, it being understood that two of the end eave brackets are of one hand and that the other two are of the opposite hand.

Looking now at Fig. 2, the additional parts for making a single prow structure 3 comprise a pair of front prow bracket members 40 (Figs. 13 and 14), a pair of rear prow bracket members 41 (Figs. 15 and 16), four additional frame members 6 and one additional frame member 8.

The front prow bracket members 40 are similar in many respects to the end gable bracket members 26, comprising opposed channel formations 42 and 43 interfitting to provide a first socket portion receiving the frame member 8, the first socket portion being closed at one end by the inturned flanges 42' and 43' acting as stops, and additional channel formations defining second and third socket portions 44 and 45 projecting from opposite sides thereof to receive the frame members 6, socket portions 44 and 45 being secured to the first socket portion by the extensions 44' and 45', and by lateral flanges as shown at 45" in Fig. 14. Formations 42 and 43 act as stops for the second and third socket portions.

The rear prow bracket members 41 also comprise opposed channel formations 46 and 47 interfitting to provide a rectangular socket receiving the frame members 6, and have an inverted U-shaped connecting part 50 secured thereto by an angle member 51 and adapted to slip over the inwardly projecting socket portions of the bracket members 15 and 16 of the basic frame structure. Also, the rear prow bracket members are provided with end stops formed by an upturned flange 52 at the end of the web portion of channel formation 47, which end stops limit the inward movement of frame members 6 so that plungers 11 automatically align with openings 21. Here again, half of bracket members 41 are of one hand and half are of the opposite hand.

As described in connection with the basic frame structure, like parts have the same color and unlike parts are distinguished by the use of different colors, making it easier for the children to remember and selected the correct part, and easier for the teacher to identify a particular part.

It is preferred that the various bracket members all comprise interfitting channel formations defining socket portions of rectangular cross section, the various frame, ridge pole and rafter members all being of rectangular cross section and differing only as to length, whereby an educational construction kit in accord with my invention uses relatively few unlike parts. This simplifies the problems of manufacture and reduces costs, and at the same time provides a highly flexible, compact and easily handled construction kit which is eminently suitable for use as a basic tool in the project method of instruction and thereby fully accomplishes the objects of the invention. Additional parts can be included in the kit of my invention, and I contemplate the inclusion of still other types of parts such as a connecting bracket member comprising only an open ended socket having opposed socket portions such as formed by parts 27 and 28 (Figs. 6 and 7).

While I have disclosed only the details of a presently preferred embodiment of my invention, I do not necessarily intended to be limited thereto but instead I intend that my invention be defined by the appended claims.

Having fully disclosed and completely described my invention, together with its mode of operation, what I claim as new is:

1. In an educational construction kit for use in conjunction with the project method of instruction in the nursery, kindergarten and primary grades, parts for constructing a rectangular frame comprising, a plurality of elongated unitary wooden frame members of flat side form and of different lengths each having substantially the same generally rectangular cross section, a plurality of first bracket members each having three socket portions extending substantially perpendicular to each other, a plurality of second bracket members each having a pair of opposed socket portions and a third socket portion extending substantially perpendicular thereto, and a plurality of third bracket members each having a pair of opposed socket portions and two further socket portions extending substantially perpendicular thereto and to each other, all of said socket portions being of flatsided form and of substantially the same generally rectangular cross section and adapted to internally receive said frame members in close slip-fitting relation therewith, laterally projecting spring-back plungers carried by each of said frame members adjacent the opposite ends thereof and on the same side thereof, and means defining an opening through a wall of each of said socket portions into which said plungers are adapted to project to releasably secure said frame members in said bracket members, said plunger receiving openings of said second bracket members all being located on the same side thereof, and said plunger receiving openings of said first and third bracket members all being located on the inside walls of the socket portions thereof, and frame member stop means defining the inner ends of the socket portions of said first and third bracket members, and the inner ends of said third socket portion of said second bracket members, and the inner ends of said two further socket portions of said third bracket members, said stop means limiting insertion of said frame members into said socket portions to a position aligning said plungers with said plunger receiving openings, whereby said frame and bracket members are readily engaged and disengaged by children in such grades while providing a sturdy structure when assembled, said frame and bracket members being of a size enabling the assembly of structures large enough for such children to enter.

2. A construction kit as set forth in claim 1, wherein each of said bracket members comprises complementary parts each having a plurality of channel formations extending at various angles, the channel formations of one part interfitting with the corresponding channel formations of the other part to provide a plurality of angularly related projecting socket portions of rectangular cross section.

3. An educational construction kit as set forth in claim 1, together with parts for constructing a gable roof for said frame comprising, a plurality of elongated wooden ridge pole and rafter members each having substantially the same generally rectangular cross section, a pair of opposed end gable bracket members each having a first socket portion adapted to internally receive said ridge pole members in slip-fitting relation therewith and laterally projecting and downwardly inclined second socket portions on opposite sides of said first socket portion for internally receiving said rafter members in slip-fitting relation therewith, a plurality of center gable bracket members each having opposed first socket portions adapted to internally receive said ridge pole members in slip-fitting relation therewith and laterally projecting and downwardly inclined second socket portions on opposite sides of said first socket portions for internally receiving said rafter members in slip-fitting relation therewith, a plurality of eave bracket members each having a socket portion adapted to internally receive said rafter members in slip-fitting relation therewith and a depending connector part of generally inverted U form adapted to slip-fit over a member of said frame, each of said ridge pole members and said rafter members having spring backed plungers projecting laterally therefrom adjacent the opposite ends thereof and on the same side thereof, and means defining an opening through a wall of each of said socket portions for receiving said plungers to releasably secure said ridge pole members and said rafter members to said gable and eave bracket members, all of said gable and eave bracket member socket portions having substantially the same generally rectangular cross-section.

4. An educational construction kit as set forth in claim 1, together with parts for making a prow structure comprising, a plurality of elongated wooden frame members each having substantially the same generally rectangular cross section, front prow bracket members each having a first socket portion and inclined second socket portions extending laterally from opposite sides thereof, rear prow bracket members each having a socket portion and a hook part of inverted U shape adapted to slip-fit over an adjacent member of said frame, said prow bracket socket portions each being of substantially the same rectangular cross section adapted to internally receive said prow frame members in slip-fitting relation therewith, spring backed plungers carried by each of said prow frame members adjacent the opposite ends thereof and on the same side thereof to project laterally therefrom, and means defining openings through a side wall of each of said prow bracket socket portions for receiving said plungers to releasably secure said prow frame members to said prow bracket members.

References Cited in the file of this patent

UNITED STATES PATENTS

| 1,973,536 | Mack | Sept. 11, 1934 |
| 2,063,895 | Mack | Dec. 15, 1936 |
| 2,112,247 | McLoughlin | Mar. 29, 1938 |
| 2,170,771 | Benjamin | Aug. 22, 1939 |
| 2,194,386 | Dunaway | Mar. 19, 1940 |
| 2,218,175 | Mack | Oct. 15, 1940 |
| 2,455,266 | Nordelman | Nov. 30, 1948 |
| 2,682,118 | Larsen | June 29, 1954 |
| 2,733,065 | Barkschat | Jan. 31, 1956 |

FOREIGN PATENTS

| 268,875 | Germany | Jan. 7, 1914 |
| 143,801 | Australia | Oct. 15, 1951 |
| 1,035,978 | France | Apr. 22, 1953 |